J. BEISHLAG.
CAR-COUPLING.

No. 184,222.        Patented Nov. 14, 1876.

Witnesses.
G. A. Smith
C. A. Johnson

Inventor,
John Beishlag,
By Thomas G. Orwig, Atty.

THE GRAPHIC CO. N.Y.

UNITED STATES PATENT OFFICE.

JOHN BEISHLAG, OF DES MOINES, IOWA.

IMPROVEMENT IN CAR-COUPLINGS.

Specification forming part of Letters Patent No. 184,222, dated November 14, 1876; application filed April 10, 1876.

*To all whom it may concern:*

Be it known that I, JOHN BEISHLAG, of Des Moines, in the county of Polk and State of Iowa, have invented an Improved Car-Coupling, of which the following is a specification:

The object of my invention is to dispense with a link and the difficulties and dangers attending the use of a link in coupling cars, and to form draw-heads in such a manner that they will mate and interlock when one is carried in higher position than the other, as frequently occurs in trains made up of different forms of cars.

It consists in a series of uniform and horizontal slots in the front ends, and a corresponding series of horizontal plates, having central and vertical perforations, as hereinafter fully set forth.

Figure 1:
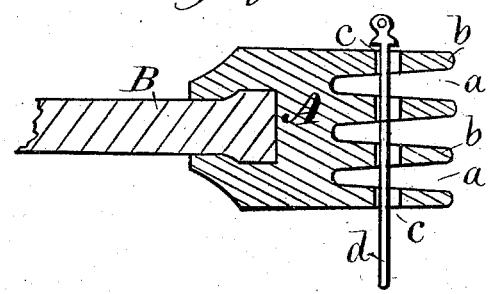
Figure 2:
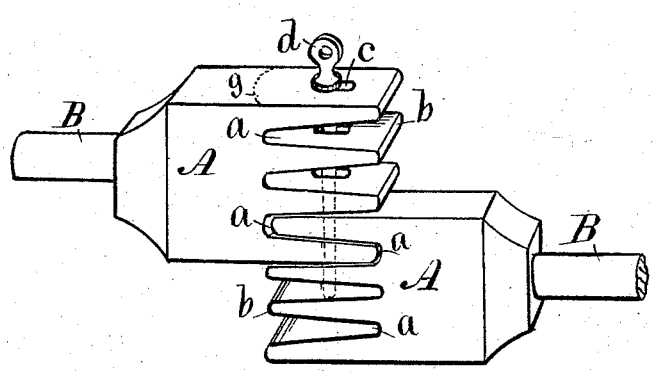

Figure 1 of my drawing is a longitudinal central section of one of my improved draw-heads. Fig. 2 is a perspective view of my complete coupling, illustrating its construction and operation.

A represents the body of the draw-head, cast to the draw-bar B, or connected therewith in any suitable way. $a\ a$ represent a series of horizontal slots in the front end of the draw-head A. $b\ b$ represent a series of horizontal plates, extending forward from the body of the draw-head. They are slightly tapering to correspond with and enter readily the slots $a$, and their free ends are rounded to correspond with the curved cavities in the rear ends of the slots, (indicated by the broken line in the top face of Fig. 2.) $c\ c$ are vertical and elongated perforations through the centers of the horizontal plates $b$. $d$ is a coupling-pin of common form, passing down through the perforations $c$ in the interlocking plates $b$.

In the practical operation of my improved coupling, one of my slotted draw-heads is placed at each end of a car. When two cars, each carrying my draw-heads, come in contact on the track, one or more of the plates $b$ of each draw-head will enter the slots $a$, and when the rounded ends of the plates $b$ reach the curved cavities $g$ in the rear ends of the slots, they will be thereby directed and adjusted so that the perforations $c$ will register, to allow the pin $d$ to be dropped through and connect the interlocking draw-heads, and thus couple the two cars together without using a link.

I am aware that draw-heads have been slotted vertically to interlock and to couple cars by passing a pin through them horizontally; but I claim that my manner of slotting draw-heads horizontally, to form series of interlocking plates or leaves that require no adjustment to couple cars varying in height, is novel and greatly advantageous.

I claim as my invention—

In a car-coupling, the draw-head A, having a series of horizontal slots, $a$, and a corresponding series of plates, $b$, each plate having a central and vertical perforation, $c$, substantially as and for the purposes shown and described.

JOHN BEISHLAG.

Witnesses:
 G. A. SMITH,
 IRA COOK.